US012681953B2

(12) United States Patent
Kim et al.

(10) Patent No.: US 12,681,953 B2
(45) Date of Patent: Jul. 14, 2026

(54) APPARATUS AND METHOD FOR SYNCHRONIZING BLOCK IN BLOCKCHAIN NETWORK

(71) Applicant: ELECTRONICS AND TELECOMMUNICATIONS RESEARCH INSTITUTE, Daejeon (KR)

(72) Inventors: Young-Chang Kim, Daejeon (KR); Jong-Choul Yim, Daejeon (KR); Jin-Tae Oh, Daejeon (KR); Chang-Hyun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 130 days.

(21) Appl. No.: 18/483,842

(22) Filed: Oct. 10, 2023

(65) Prior Publication Data

US 2024/0119064 A1      Apr. 11, 2024

(30) Foreign Application Priority Data

Oct. 11, 2022    (KR) ......................... 10-2022-0129663
Sep. 5, 2023    (KR) ......................... 10-2023-0117872

(51) Int. Cl.
*G06F 16/00* (2019.01)
*G06F 11/1446* (2026.01)
*G06F 16/27* (2019.01)

(52) U.S. Cl.
CPC ........ *G06F 16/275* (2019.01); *G06F 11/1448* (2013.01)

(58) Field of Classification Search
CPC ... G06F 16/275; G06F 11/1448; G06F 11/448
(Continued)

(56) References Cited

U.S. PATENT DOCUMENTS 10,839,377 B2    11/2020    Scrivner et al.
11,036,677 B1 *    6/2021    Grunwald .............. G06F 3/065
                                        707/707

(Continued)

FOREIGN PATENT DOCUMENTS

KR          102406020 B1      6/2022
KR      1020230090027 A      6/2023

*Primary Examiner* — Alexandria Y Bromell
(74) *Attorney, Agent, or Firm* — Rabin & Berdo, P.C.

(57)                    ABSTRACT

Disclosed herein is an apparatus and method for synchronizing a block in a blockchain network. The apparatus synchronizes node information of existing participating nodes connected to a blockchain network by joining the blockchain network, determines synchronization target blocks by calculating the current section of a blockchain using an agreed-upon block received from the existing participating nodes, receives a block header of each section and the segment hash table of a snapshot that are verification data for verifying synchronization target data for the synchronization target blocks from participating nodes that are not connected as peers, among the existing participating nodes, generates a snapshot by receiving snapshot segments and the blocks of the current section, which are the synchronization target data, from participating nodes connected as peers, among the existing participating nodes, verifies the snapshot generated from the snapshot segments, and synchronizes the verified snapshot.

18 Claims, 8 Drawing Sheets

(58) Field of Classification Search
   USPC .......................................................... 707/611
   See application file for complete search history.

(56) References Cited

U.S. PATENT DOCUMENTS

| | | | |
|---|---|---|---|
| 11,182,403 B2 | 11/2021 | Aseev | |
| 11,343,073 B2 | 5/2022 | Oh et al. | |
| 11,494,403 B2 | 11/2022 | Lee et al. | |
| 2019/0220603 A1* | 7/2019 | Gopalakrishnan | G06F 21/64 |
| | | | 707/707 |
| 2020/0363777 A1* | 11/2020 | Vitaterna | G06F 16/27 |
| 2021/0117385 A1* | 4/2021 | Haldar | G06F 11/1448 |
| | | | 707/707 |
| 2021/0263910 A1* | 8/2021 | Xiao | G06F 16/27 |
| 2021/0264520 A1* | 8/2021 | Cummings | G06Q 40/06 |
| | | | 707/707 |
| 2021/0334176 A1* | 10/2021 | Sears | G06F 21/602 |
| | | | 707/707 |
| 2022/0131938 A1* | 4/2022 | Nobuhara | H04L 9/0643 |
| 2022/0214995 A1* | 7/2022 | Wu | G06F 16/182 |
| 2022/0358450 A1* | 11/2022 | Stephens | A63F 13/79 |
| 2022/0368532 A1 | 11/2022 | Heo | |
| 2022/0377133 A1* | 11/2022 | Williams | H04L 67/10 |
| | | | 707/707 |
| 2023/0188367 A1* | 6/2023 | Kim | H04L 9/50 |
| | | | 713/171 |

* cited by examiner

APPARATUS AND METHOD FOR SYNCHRONIZING BLOCK IN BLOCKCHAIN NETWORK

CROSS REFERENCE TO RELATED APPLICATIONS

This application claims the benefit of Korean Patent Applications No. 10-2022-0129663, filed Oct. 11, 2022, and No. 10-2023-0117872, filed Sep. 5, 2023, which are hereby incorporated by reference in their entireties into this application.

BACKGROUND OF THE INVENTION

1. Technical Field

The present disclosure relates generally to blockchain technology, and more particularly to technology for synchronizing blocks in a blockchain network.

2. Description of the Related Art

In order to tolerate Byzantine faults, 3f+1 that is the number of consensus nodes to be included in a consensus congress and difficulty are determined depending on the ratio between the number of nodes (participating nodes) that are connected to a blockchain network and eligible to participate in the consensus and the number of Byzantine nodes. The difficulty is used to check whether a participating node is eligible to participate in a block consensus, and is also used when a chair node verifies whether a node for the next block consensus is eligible to participate in the consensus. Therefore, it is necessary for all of the participating nodes connected to the blockchain to use the same difficulty and the same number of consensus nodes (3f+1). To this end, all of the participating nodes are required to maintain the same information about the participating nodes connected to the blockchain. That is, research on a method for consistently maintaining information about nodes dynamically connected to a network for each block in the Peer-to-Peer-(P2P)-based blockchain network is required.

Generally, when a new node is connected to a blockchain network, the new node is required to receive blocks from a genesis block to a block currently agreed upon from other nodes and to synchronize the state thereof by executing a transaction stored in each of the blocks in the order of the blocks such that the new node has the same state as the other nodes. Here, it may take a few days, a few weeks, or a few months to perform such a synchronization method depending on the number of blocks. Therefore, it is necessary to research a method for quickly synchronizing blocks in order to enable a new node to quickly participate in a distributed consensus.

Meanwhile, a dishonest node, among the nodes connected to the blockchain, may distort the state, store the same as a snapshot, and transfer the snapshot to a new node, whereby the erroneous state may be synchronized. Also, when nodes connected to the blockchain are connected to the network through a cloud service, the amount of data that each of the nodes has to transfer is increased with an increase in the size of the snapshot, and an increase in the network traffic for transferring the snapshot results in the increasing cost of using the network.

Meanwhile, Korean Patent No. 10-2406020, titled "Apparatus and method for distributed consensus based on decentralized Byzantine fault tolerance" discloses technology for optimizing distributed consensus protocols and messages based on Byzantine Fault Tolerance (BFT) of decentralized nodes.

However, Korean Patent No. 10-2406020 does not suggest a method for synchronizing a block when an existing participating node is terminated and is then reconnected to a network.

SUMMARY OF THE INVENTION

An object of the present disclosure is to synchronize blocks in parallel such that a node newly connected or reconnected to a blockchain network quickly participates in a distributed consensus in a distributed consensus environment based on decentralized Byzantine fault tolerance.

Another object of the present disclosure is to verify synchronization even when a Byzantine node maliciously hinders synchronization.

In order to accomplish the above objects, an apparatus for synchronizing a block in a blockchain network according to an embodiment of the present disclosure includes one or more processors and memory for storing at least one program executed by the one or more processors. The at least one program synchronizes node information of existing participating nodes connected to the blockchain network by joining the blockchain network, determines synchronization target blocks by calculating the current section of a blockchain using an agreed-upon block received from the existing participating nodes, receives a block header of each section and the segment hash table of a snapshot that are verification data for verifying synchronization target data for the synchronization target blocks from participating nodes that are not connected as peers, among the existing participating nodes, generates a snapshot by receiving snapshot segments and blocks of the current section, which are the synchronization target data, from participating nodes connected as peers, among the existing participating nodes, verifies the snapshot generated from the snapshot segments, and synchronizes the verified snapshot.

Here, the section may be set to include a preset number of blocks in order of block numbers depending on a size preset in the blockchain, and the snapshot may be generated for each section in the blockchain, thereby including block information corresponding to the section.

Here, the at least one program may verify the signature information of the block header of the agreed-upon block using the node information.

Here, the at least one program may calculate the current section of the blockchain using the block number of the agreed-upon block.

Here, the at least one program may verify, for each section, whether the hash value of a previous block header stored in the start block of the section is equal to the hash value of the block header of the last block of the previous section using the block header of each section, thereby verifying continuity of the agreed-upon block.

Here, when a full synchronization mode is set, the at least one program may calculate the number of snapshot segments and request the snapshot segments and missing blocks of the current section from the participating nodes connected as peers.

Here, when a partial synchronization mode is set, the at least one program may request blocks to receive from the participating nodes connected as peers based on any one of a previously stored last snapshot and a previously stored last block.

Here, the existing participating nodes may partition the snapshot into segments having a preset size, calculate hash values for the segments, and store the hash values in the segment hash table.

Here, the at least one program may calculate a hash value for the snapshot using the segments and verify the hash value using the segment hash table.

Here, the at least one program may store the snapshot in a state database for storing information about nodes receiving the agreed-upon block and a block store for storing the agreed-upon block in order to synchronize a blockchain state when connected to the blockchain network, thereby synchronizing the snapshot.

Also, in order to accomplish the above objects, a method for synchronizing a block in a blockchain network, performed by an apparatus for synchronizing a block in the blockchain network, according to an embodiment of the present disclosure includes synchronizing node information of existing participating nodes connected to the blockchain network by joining the blockchain network, determining synchronization target blocks by calculating the current section of a blockchain using an agreed-upon block received from the existing participating nodes, receiving a block header of each section and the segment hash table of a snapshot that are verification data for verifying synchronization target data for the synchronization target blocks from participating nodes that are not connected as peers, among the existing participating nodes, generating a snapshot by receiving snapshot segments and blocks of the current section, which are the synchronization target data, from participating nodes connected as peers, among the existing participating nodes, verifying the snapshot generated from the snapshot segments, and synchronizing the verified snapshot.

Here, the section may be set to include a preset number of blocks in order of block numbers depending on a size preset in the blockchain, and the snapshot may be generated for each section in the blockchain, thereby including block information corresponding to the section.

Here, synchronizing the node information may comprise verifying the signature information of the block header of the agreed-upon block using the node information.

Here, determining the synchronization target blocks may comprise calculating the current section of the blockchain using the block number of the agreed-upon block.

Here, receiving the block header of each section and the segment hash table of the snapshot may comprise verifying, for each section, whether the hash value of a previous block header stored in the start block of the section is equal to the hash value of the block header of the last block of the previous section using the block header of each section, thereby verifying continuity of the agreed-upon block.

Here, receiving the block header of each section and the segment hash table of the snapshot may comprise calculating the number of snapshot segments and requesting the snapshot segments and missing blocks of the current section from the participating nodes connected as peers when a full synchronization mode is set.

Here, receiving the block header of each section and the segment hash table of the snapshot may comprise requesting blocks to receive from the participating nodes connected as peers based on any one of a previously stored last snapshot and a previously stored last block when a partial synchronization mode is set.

Here, the existing participating nodes may partition the snapshot into segments having a preset size, calculate hash values for the segments, and store the hash values in the segment hash table.

Here, synchronizing the verified snapshot may comprise calculating a hash value for the snapshot using the segments and verifying the hash value using the segment hash table.

Here, synchronizing the verified snapshot may comprise storing the snapshot in a state database for storing information about nodes receiving the agreed-upon block and a block store for storing the agreed-upon block in order to synchronize a blockchain state when connected to the blockchain network, thereby synchronizing the snapshot.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

Figure 1:
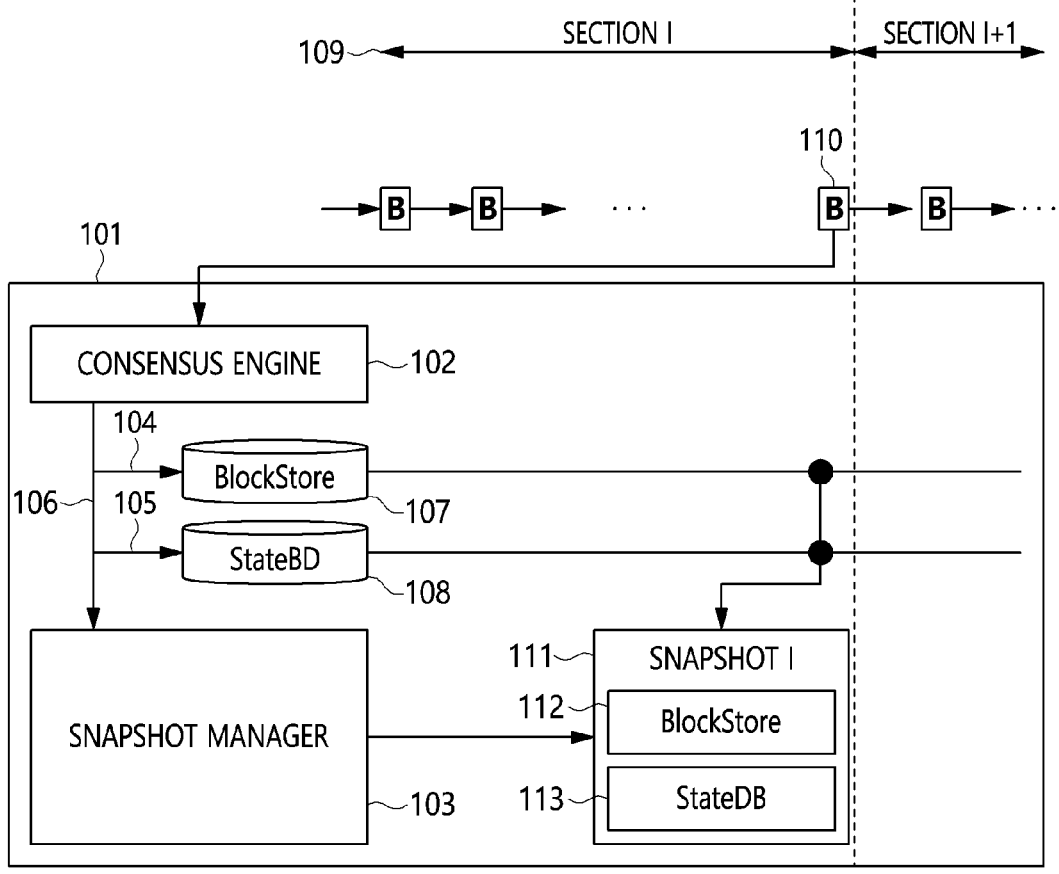
FIG. 1 is a view illustrating a process in which a participating node connected to a blockchain network generates a snapshot for synchronization according to an embodiment of the present disclosure.

The present disclosure will be described in detail below with reference to the accompanying drawings. Repeated descriptions and descriptions of known functions and configurations which have been deemed to unnecessarily obscure the gist of the present disclosure will be omitted below. The embodiments of the present disclosure are intended to fully describe the present disclosure to a person having ordinary knowledge in the art to which the present disclosure pertains. Accordingly, the shapes, sizes, etc. of components in the drawings may be exaggerated in order to make the description clearer.

Throughout this specification, the terms "comprises" and/or "comprising" and "includes" and/or "including" specify the presence of stated elements but do not preclude the presence or addition of one or more other elements unless otherwise specified.

Hereinafter, a preferred embodiment of the present disclosure will be described in detail with reference to the accompanying drawings.

Nodes connected to a blockchain network agree upon a block, and nodes receiving the block that is agreed upon may store the block in a state database (DB). Here, when a new node is connected to the network or when a node connected to the blockchain is terminated and reconnected to the network, the block agreed upon may be stored in a block store in order to synchronize the blockchain state. For each block, the nodes connected to the blockchain participate in a consensus congress for the block after verification of the eligibility to participate in the block consensus and agree upon the block, and information about the corresponding nodes may be synchronized across all of the nodes. Information about the node newly connected to the blockchain network or disconnected therefrom may be synchronized.

The present disclosure intends to present a method for synchronizing a blockchain state after a new node connected to a network or a node reconnected to the network after being disconnected therefrom synchronizes information of the existing nodes connected to the blockchain network according to the prior patent in the above-described environment.

FIG. 1 is a view illustrating a process in which a participating node connected to a blockchain network generates a snapshot for synchronization according to an embodiment of the present disclosure.

Referring to FIG. 1, upon receiving a block 110 that is agreed upon in a consensus engine 102, every participating node 101 connected to a blockchain may calculate a section number 109, based on which a snapshot for synchronization is generated, using the number of the agreed-upon block.

The section may be set based on a preset or fixed number of blocks in the system. If the size of the section is set to 1000 blocks, 1000 blocks may be regarded as a single section. For example, first to 1000th blocks may be set as section 1, and 1001th to 2000th blocks may be set as section 2.

When the participating node 101 receiving the agreed-upon block 110 determines that the number of the received block corresponds to the last block of the corresponding section, the participating node 101 may execute the transaction contained in the block and apply the same to a state DB 108 (105), and may store the corresponding block in a block store 107 (104).

Then, when one section is completed, the consensus engine 102 may instruct a snapshot manager 103 to generate a snapshot for the state DB 108 and the block store 107.

Here, the snapshot 112 of the block store may be generated for each section.

That is, information about the 1000 blocks of the corresponding section may be stored in the snapshot 112 of the block store.

Also, the generated snapshot 112 may be used after being compressed in order to reduce a transmission data size.

Here, when it receives a new agreed-upon block after one section is completed, the consensus engine 102 may store the corresponding block in the snapshot of the block store of a new section in order to generate a next snapshot.

Figure 2:
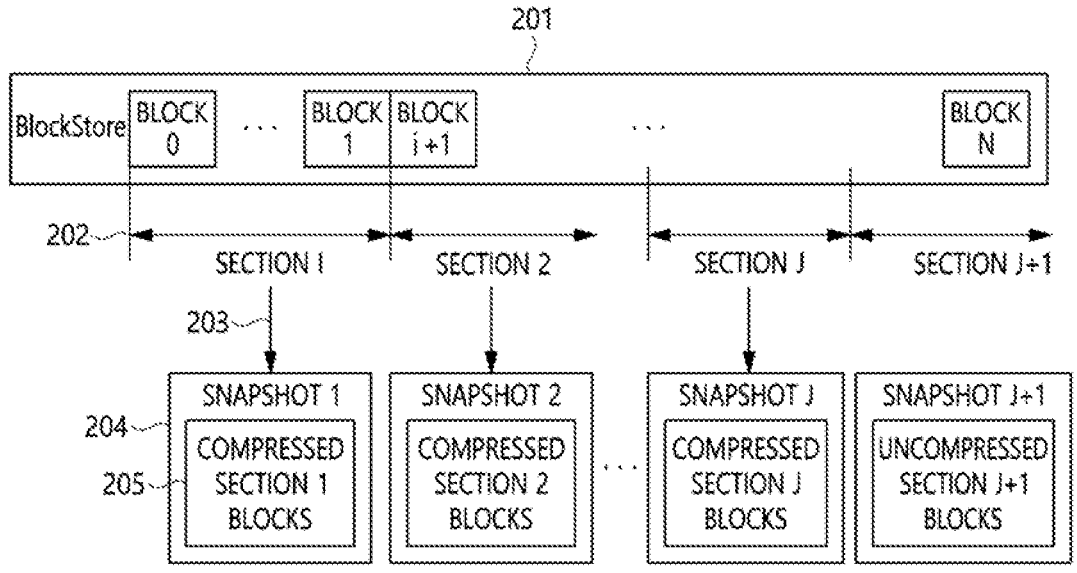
FIG. 2 is a view illustrating a block store stored in a participating node and the structure of a snapshot of the block store according to an embodiment of the present disclosure.

FIG. 2 is a view illustrating a block store stored in a participating node and the structure of the snapshot of the block store according to an embodiment of the present disclosure.

Referring to FIG. 2, the participating node 101 of FIG. 1 may receive a block that is agreed upon and verify the block in the consensus engine 102. The verified block may be stored in a block store 201.

As described with reference to FIG. 1, a section is identified depending on the preset number of blocks, and the consensus engine 102 may generate a snapshot for each section and store the same.

FIG. 2 illustrates the state in which blocks up to block n are stored in the block store 201. Here, the size of each section is i+1. Accordingly, it can be seen that blocks from block 0, which is a genesis block, to block i correspond to section 1 (202). In FIG. 2, it can be seen that block n, which is the current block, belongs to section j+1 and the section is not yet completed. When the section is completed, the participating node may store the blocks of the corresponding section as a snapshot.

Here, it can be seen that a snapshot generated (203) by storing the blocks of section 1 in the block store is snapshot 1 (204) and that the snapshot for the block store comprises the compressed blocks of section 1 (205).

When a section is not completed, like section j+1, each time a block is received, the block in an uncompressed form is added and stored, like the uncompressed blocks of section j+1. Here, when the section is completed and all of the blocks of the section are stored, the blocks may be stored in a compressed form, like the compressed blocks of section j.

Figure 3:
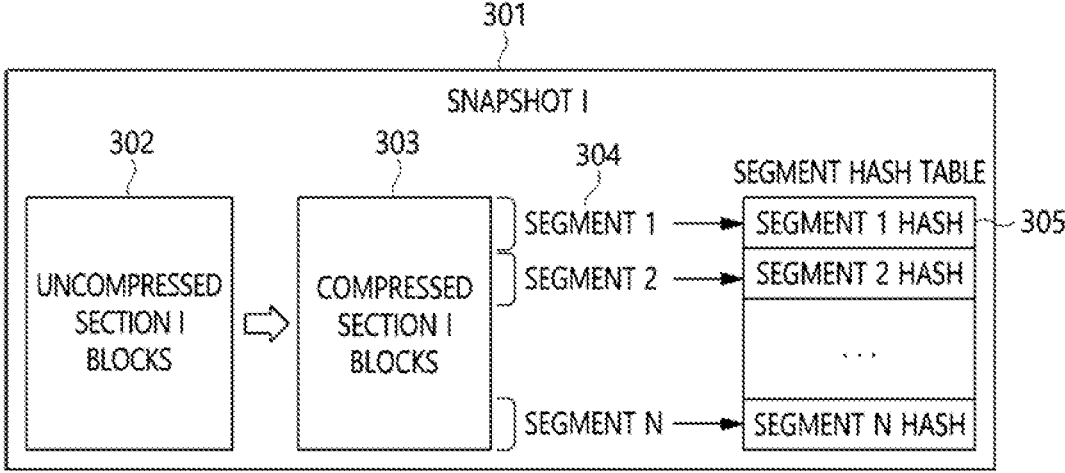
FIG. 3 is a view illustrating information about a snapshot of a block store according to an embodiment of the present disclosure.

FIG. 3 is a view illustrating information about a snapshot of a block store according to an embodiment of the present disclosure.

Referring to FIG. 3, when section i is completed, the uncompressed blocks 302 of section i of a corresponding snapshot 301 are compressed and thereby converted into compressed blocks 303 of section i in order to reduce the size of data to be transmitted over a network at the time of synchronization, as illustrated in FIG. 2.

Then, the node receiving the block snapshot may partition the block snapshot into segments 304 having a preset size, calculate hash values for the segments, and store the hash values in a segment hash table 305 in order to verify the corresponding snapshot.

When a new participating node joins a blockchain network, it may receive the segments 304 of the compressed block snapshot and the segment hash table in parallel from a plurality of other participating nodes.

Here, the new participating node may reconstruct the compressed block snapshot 303 by combining the received segments, calculate segment hashes for the reconstructed block snapshot, and verify the block snapshot using the received segment hash table.

Accordingly, the new participating node may prevent erroneous information transferred by a malicious node from causing synchronization of an erroneous block.

Figure 4:
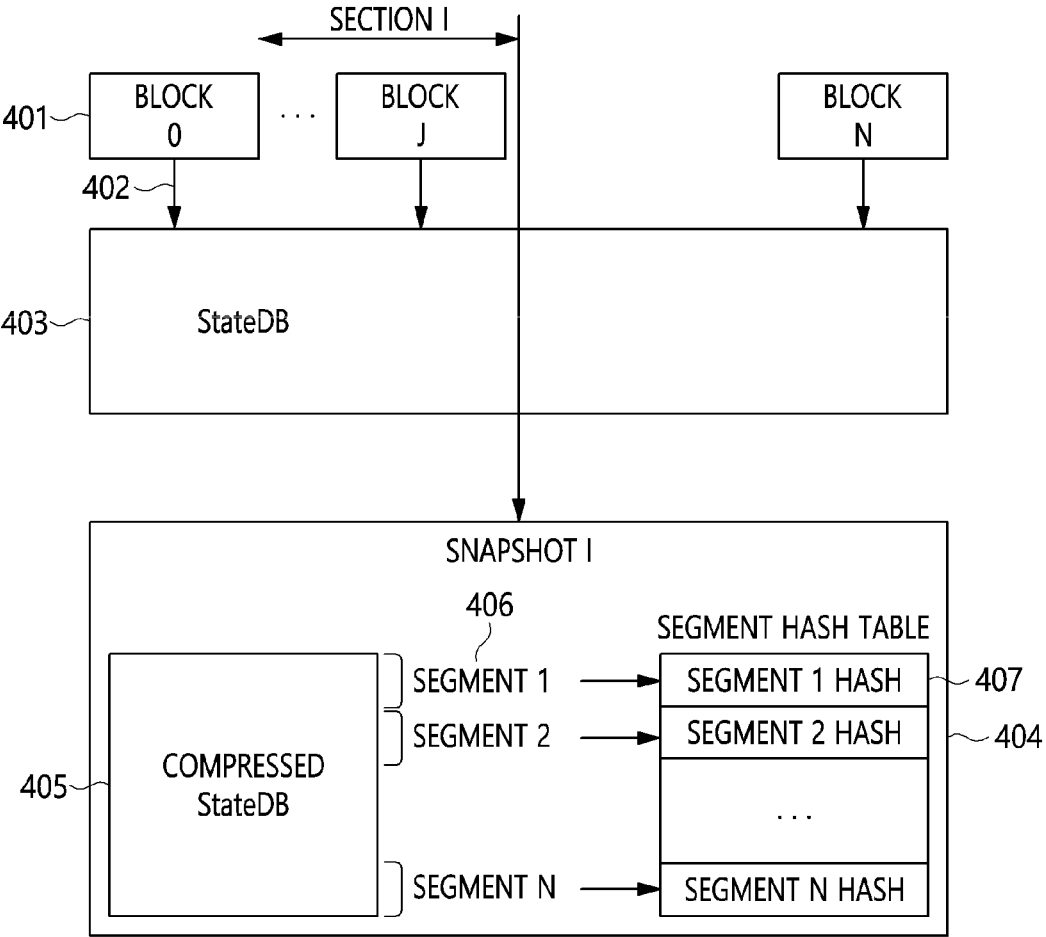
FIG. 4 is a view illustrating information about a snapshot of a state database (DB) according to an embodiment of the present disclosure.

FIG. 4 is a view illustrating information about a snapshot of a state DB according to an embodiment of the present disclosure.

Referring to FIG. 4, it can be seen that a state DB stores a snapshot only for the last section, unlike a block store.

A participating node reconnected to a blockchain network after disconnected therefrom may synchronize only the missing blocks, which are identified based on the last block number stored in the block store thereof and the block received when reconnected to the blockchain network, from the blocks of other participating nodes.

Here, the participating node executes the synchronized blocks and applies the same to the state DB, thereby maintaining the state DB up-to-date.

In contrast, a new participating node synchronizes the state DB snapshots of up to the most recent completed section, synchronizes the blocks of the current section, and applies the synchronized blocks to the synchronized state DB, thereby maintaining the state DB up-to-date.

To this end, the participating node connected to the blockchain generates a snapshot i 404 from the state DB 403, in which blocks up to the last block j 401 of the last section (section i) are applied (402), and stores the same, as illustrated in FIG. 4. Here, the participating node may generate a compressed state DB snapshot 405, like the snapshot of the block store illustrated in FIG. 3, in order to reduce the network transfer cost.

Also, the participating node may partition the compressed state DB snapshot into segments 406 having a fixed size, like the compressed snapshot of the block store, and generate a segment hash table 407 by calculating hash values to be used as verification data for the segments.

Figure 5:
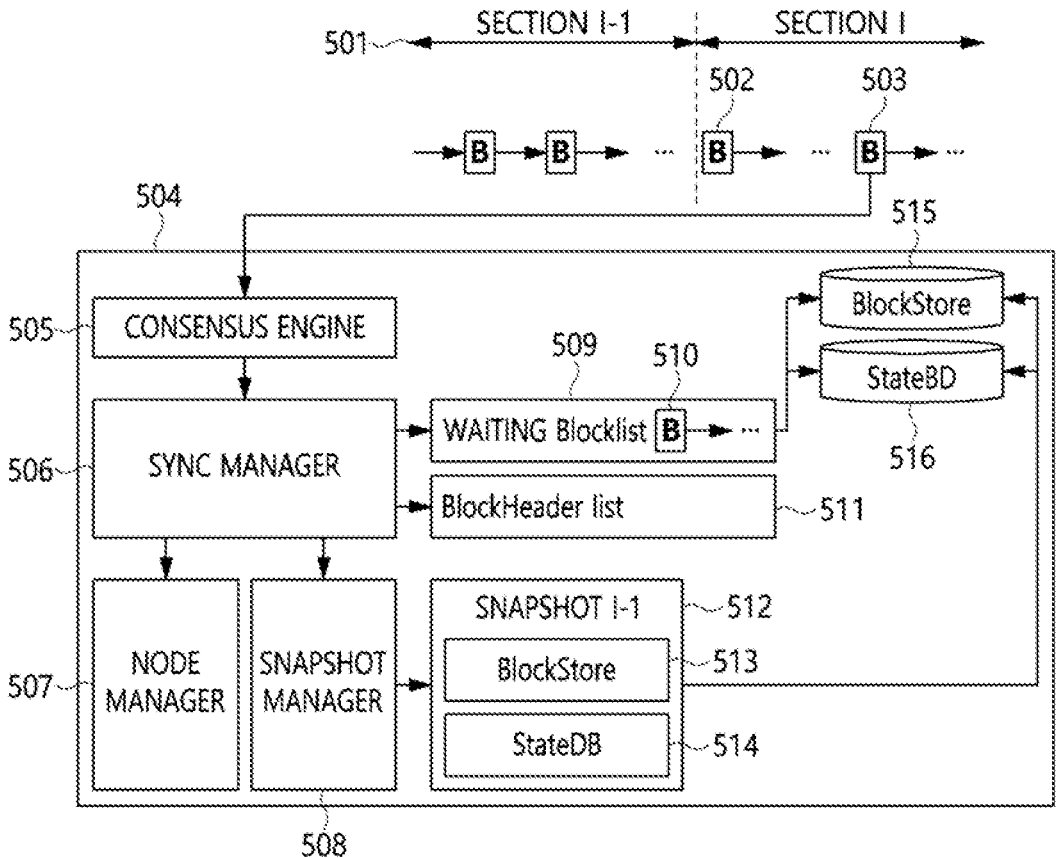
FIG. 5 is a view illustrating a process in which a new participating node synchronizes a blockchain with an existing participating node according to an embodiment of the present disclosure.

FIG. 5 is a view illustrating a process in which a new participating node synchronizes a blockchain with an existing participating node according to an embodiment of the present disclosure.

Referring to FIG. 5, a new participating node 504 may synchronize information of existing participating nodes after being connected to a blockchain network in section i, store the node information through a node manager 507, and receive a block 503 that is agreed upon.

Here, upon receiving the agreed-upon block, the consensus engine 505 of the new participating node 504 may verify the signature information of the header of the agreed-upon block using the synchronized node information and transfer the verified block to a synchronization manager 506.

After it determines the synchronization state, the synchronization manager 506 may insert the block 503 into a waiting blocklist 509 if the block is received when synchronization is not yet completed. Then, the synchronization manager 506 may perform synchronization by making a request to the existing participating nodes.

Here, the synchronization manager 506 may receive the actual block and state DB required for the synchronization from the participating nodes directly connected as peers.

However, in case any of the participating nodes connected as peers hinders synchronization with a malicious purpose, the synchronization manager 506 may receive information for verifying the data received from the peers from non-peers, that is, participating nodes that are not directly connected as peers.

To this end, the synchronization manager 506 may request the headers of the start block and last block of each section from a plurality of non-peer participating nodes, but for the current section (section i), it may request only the header of the start block 502 therefrom.

Here, the synchronization manager 506 may request the block headers for each section from the multiple participating nodes in order to verify whether any of the non-peer participating nodes maliciously transfers erroneous information.

The new participating node may receive the headers of the start and last blocks of each section and insert the same into a block header list 511, and when the block headers for sections 1 to i–1 (501) and the header of the start block 502 for the current section have been received, the new participating node may check the continuity of the block headers between the respective sections.

That is, the new participating node may check whether the header hash of the last block of section i–1 is equal to the previous block header hash in the start block of section i.

Here, the new participating node may also request the segment hash table of a snapshot when it requests the block headers from the non-peer participating nodes.

Here, when the segment hash table has a large size, the new participating node may request segments of the segment hash table by specifying the modulus of the segment numbers of the segments to receive from the non-peer participating nodes and the number of non-participating nodes in order to receive the segments in parallel.

That is, when the new participating node requests the segments from four non-peer participating nodes, one of the non-peer participating nodes that receives '0' may transfer only the hash values of the segments corresponding to the segment numbers 0, 4, 8, . . . in the segment hash table.

Like when the block headers are requested, a plurality of non-peer participating nodes may be selected as the nodes to transfer the corresponding hash values, and the received hash values of the segments may be verified.

When verification of the block headers corresponding to each section and the transfer of the segment hash table of the snapshot are completed, the new participating node may synchronize the snapshot and the missing blocks, which are blocks from the start block 502 of the current section (section i) to the previous block of the block 503 acquired when the new participating node joins the network, by receiving the same from the participating node connected as peers.

First, the new participating node assigns the segments of the snapshot and the missing blocks to receive in parallel to the participating nodes connected as the peers thereof based on the number of peer participating nodes and requests the same through a snapshot manager.

Here, the snapshot manager may synchronize the block store snapshot 513 of sections 1 to i and the state DB snapshot 514 of section i, and may reconstruct a block store 515 and a state DB 516 from the snapshots 512 when synchronization is completed. Then, the block content of the current section stored in the waiting blocklist 509 is applied to the reconstructed state DB 516, and the applied block may be stored in the block store 515.

Figure 6:
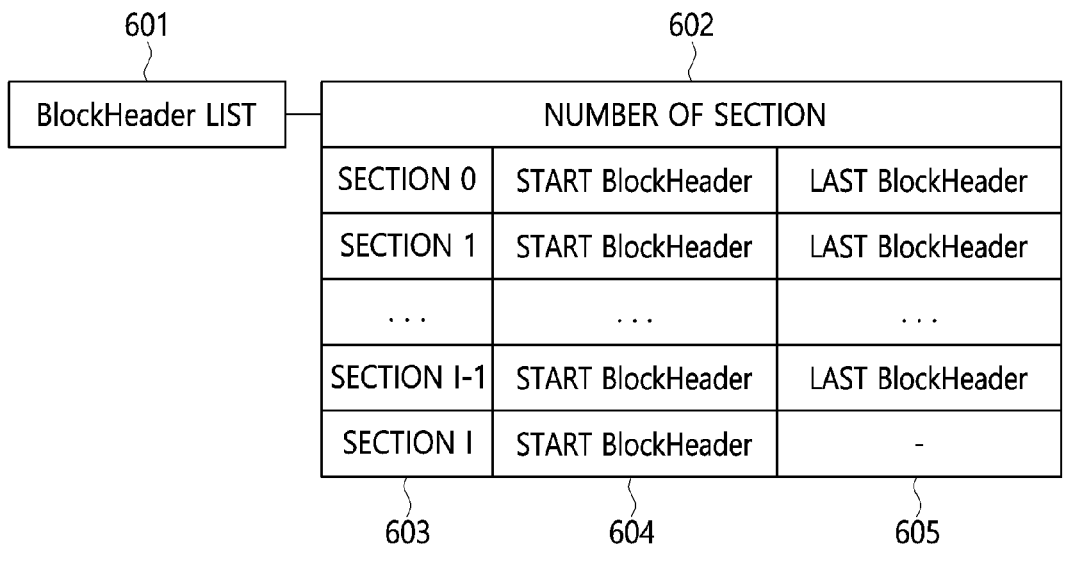
FIG. 6 is a view illustrating in detail an example of the structure of the block header list illustrated in FIG. 5.

FIG. 6 is a view illustrating in detail an example of the structure of the block header list illustrated in FIG. 5.

Referring to FIG. 6, when a new participating node synchronizes information of existing nodes by joining a blockchain network and starts receiving agreed-upon blocks in the current section (section i) 603, it may store the start block header of the current section (section i) 603 and the headers of the start blocks 604 and last blocks 605 of sections 0 to i–1. The header of each block may include information for verifying the block and the header hash of the previous block.

Accordingly, the new participating node may verify the continuity between the last block of each section and the start block of the subsequent section. That is, the header hash of the last block of section 0 may be equal to the previous block header hash stored in the start block header of section 1. For more thorough verification, the successive block headers randomly selected in the section may be checked.

That is, when each section has a size of 1000 blocks and when the section is the first section, the new participating node may verify the header of block 0, which is the start block, and the header of block 999, which is the last block, and may also verify the randomly selected blocks, e.g., blocks 99, 100, 777, 778, and the like, by requesting the same, or may request and verify the headers of all of the blocks in the section, that is, blocks 0 to 999.

Figure 7:
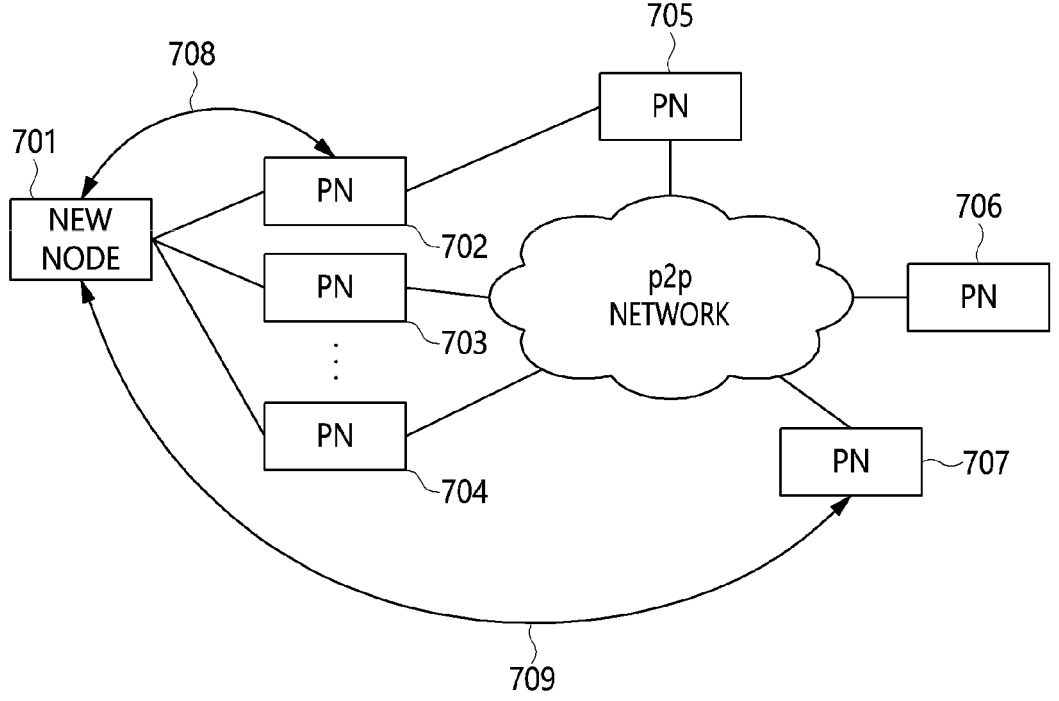
FIG. 7 is a view illustrating data that a new participating node receives from peer participating nodes and non-peer participating nodes connected over a peer-to-peer (P2P) network according to an embodiment of the present disclosure.

FIG. 7 is a view illustrating data that a new participating node receives from peer participating nodes and non-peer participating nodes connected over a peer-to-peer (P2P) network according to an embodiment of the present disclosure.

Referring to FIG. 7, it can be seen that a new participating node 701 is connected to a P2P network and participating nodes 702 to 704 are registered as the peers thereof. Also, additional participating nodes 705 to 707 are connected to the new participating node via other nodes over the P2P network.

As illustrated in FIG. 7, the new participating node 701 may receive a snapshot and the blocks of the current section from the participating nodes 702 to 704 that are connected as the peers thereof, thereby performing synchronization.

Here, the new participating node 701 may receive the block headers of each section and the segment hash table of the snapshot, which are required for verifying the synchronized snapshot, from the non-peer nodes 705 to 707.

Figure 8:
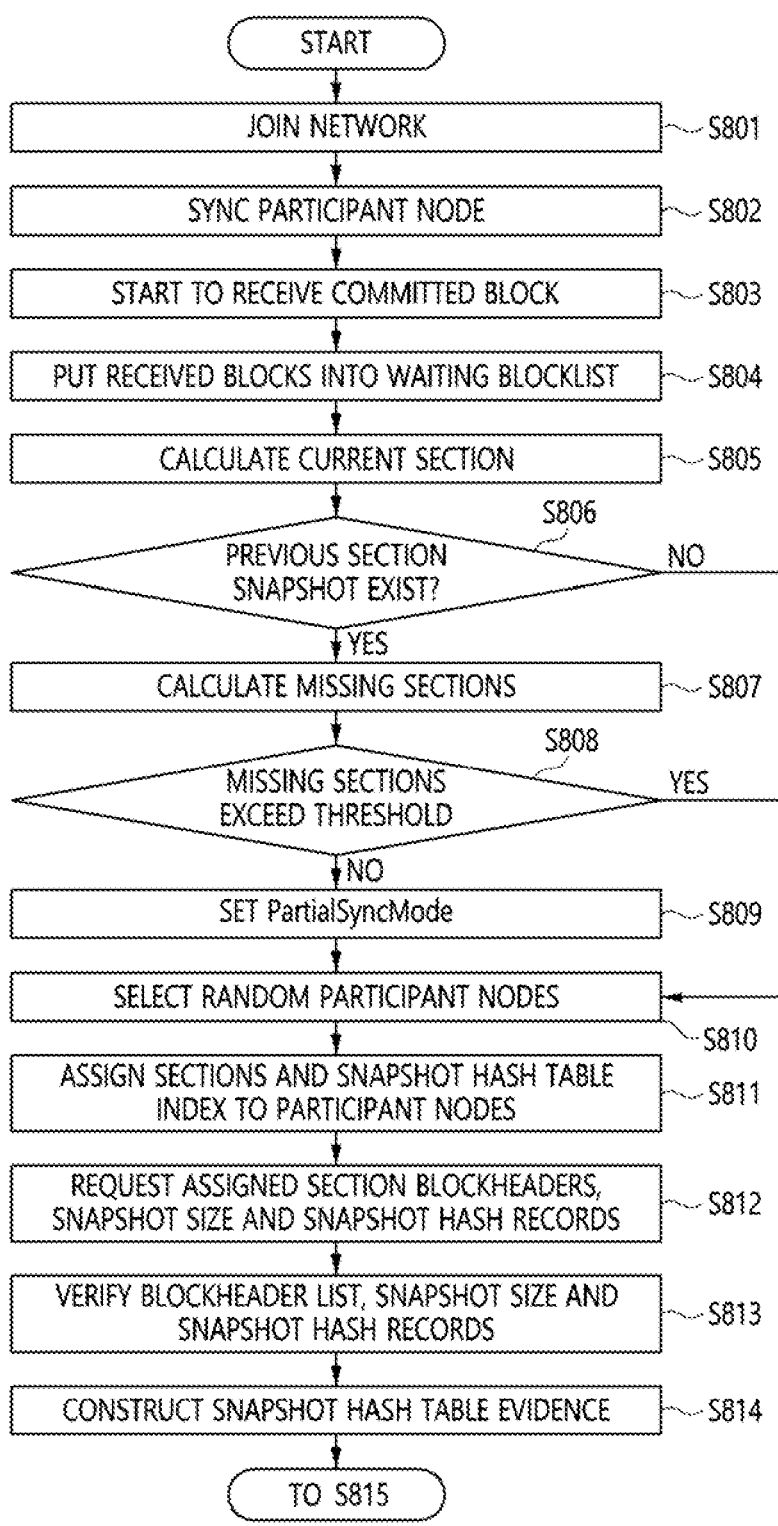
FIG. 8 and FIG. 9 are views illustrating a method for synchronizing a block in a blockchain network according to an embodiment of the present disclosure.
Figure 9:
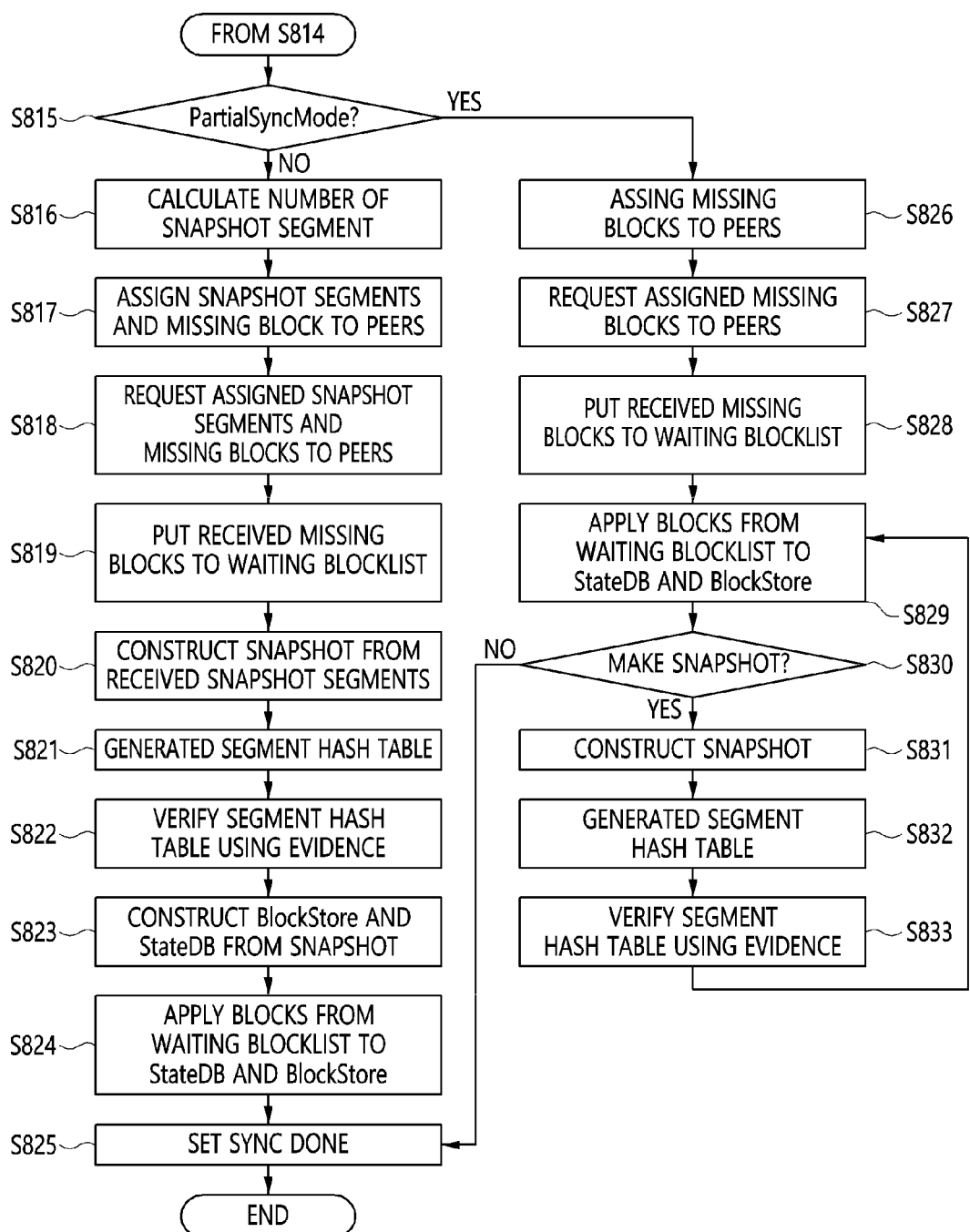

FIG. 8 and FIG. 9 are flowcharts illustrating a method for synchronizing a block in a blockchain network according to an embodiment of the present disclosure.

Referring to FIG. 8, first, a new participating node may join a blockchain network at step S801.

Here, the new participating node may receive node information of participating nodes connected to the blockchain network and synchronize the same at step S802.

Here, at step S802, the signature information of the block header of an agreed-upon block may be verified using the node information.

Also, when synchronization of the node information of the participating nodes is completed, the new participating node may receive the agreed-up block from the participating nodes over a network at step S803.

Also, the new participating node may insert the agreed-upon block into a waiting blocklist at step S804.

Then, the new participating node may calculate the current section of the blockchain using the number of the agreed-upon block at step S805.

Also, the new participating node may determine at step S806 whether snapshots of the previous sections are present.

Here, the section may be set to include a preset number of blocks in the order of block numbers depending on the size preset in the blockchain, and the snapshot may be generated for each section in the blockchain, thereby including block information corresponding to the section.

Also, when snapshots of the previous sections are present, the new participating node may determine the sections required for synchronization at step S807 by calculating the difference between the current section and the section to which the last snapshot belongs in order to perform a partial synchronization mode.

Here, at step S807, the number of blocks may be calculated using the size of the sections required for synchronization.

Here, at step S808, when the number of missing sections does not exceed a preset value, a partial synchronization mode (PartialSyncMode) is set for partial synchronization at step S809, whereas when the number of missing sections exceeds the preset value, full synchronization may be performed because it is determined that full synchronization is more efficient than partial synchronization at step S810.

Subsequently, synchronization is performed by requesting verification data for verifying the snapshot and blocks to be synchronized and requesting the snapshot and blocks to be synchronized.

First, in order to request the verification data, the new participating node may randomly select a preset number of non-peer participating nodes depending on the number of sections at step S810.

Also, the new participating node may assign the block headers of the respective sections and the segments of a snapshot hash table for verification of the snapshot to the randomly selected participating nodes at step S811.

Also, the new participating node may request the assigned block headers of the sections, the assigned snapshot hash records (segment hash table), and a snapshot size from the randomly selected participating nodes at step S812.

Here, at step S812, whether the hash value of a previous block header stored in the start block of each section is equal to the hash value of the header of the last block of the previous section is verified using the block headers of the respective sections, whereby the continuity of the agreed-upon block may be verified.

Also, the new participating node may insert the block headers of each section into a block header list when it receives the requested data, and may verify the block header list, the snapshot size, and the snapshot hash records (segment hash table) at step S813.

Also, the new participating node may generate snapshot hash table verification data at step S814.

Referring to FIG. 9, when construction of verification data is completed, the new participating node may determine whether a partial synchronization mode is set at step S815.

When not a partial synchronization mode but a full synchronization mode is set, the new participating node may calculate the number of segments of a snapshot in order to synchronize the snapshot from the snapshot of peer participating nodes at step S816.

Then, the new participating node may assign snapshot segments and the missing blocks of the current section to the peer participating nodes at step S817.

Also, the new participating node may request the assigned snapshot segments and the assigned missing blocks of the current section from the peer participating nodes at step S818.

Also, the new participating node may insert the blocks received from the peer participating nodes into the waiting blocklist at step S819.

Also, the new participating node may generate a snapshot from the received snapshot segments at step S820.

Then, the new participating node may generate a segment hash table by calculating hash values for the respective segments of the generated snapshot at step S821.

Also, the new participating node may verify the segment hash table at step S822 using the verification data generated at step S814.

Here, at step S822, a hash value for the snapshot is calculated using the segments, and the hash value may be verified using the segment hash table.

Here, when verification fails at step S822, the process may proceed according to the policy of the blockchain platform.

If a participating node transferring erroneous information is identified at step S822, a transaction for announcing this is generated and disseminated to the blockchain network, and the corresponding node may be held accountable for the malicious behavior, or simply, synchronization may be performed again or terminated.

Also, when verification of the snapshot is completed, the new participating node may reconstruct a block store and a state DB from the snapshot at step S823.

Then, the new participating node may apply the blocks in the waiting blocklist to the state DB, which stores the information about the nodes receiving the agreed-upon block, in the order of block numbers, and may store the applied blocks in the block store for storing the agreed-upon block in order to synchronize the blockchain state when connected to the blockchain network at step S824.

Here, the new participating node may terminate synchronization at step S825.

In the case of partial synchronization, reconstruction may be started from the last snapshot stored in the new participating node, or blocks subsequent to the last block stored in the block store may be synchronized and applied to the block store and state DB of the new participating node.

Also, when it is determined at step S815 that a partial synchronization mode is set, partial synchronization may be performed at step S826.

Because it needs to synchronize blocks up to the current block based on the last state of the node, the new participating node may assign the blocks to receive to peer participating nodes at step S826.

Here, the new participating node may request the assigned missing blocks from the peer participating nodes at step S827.

Here, at step S827, the blocks to receive may be requested from the participating nodes connected as peers based on any one of the previously stored last snapshot and last block.

Here, at step S827, the received blocks are applied to the state DB, and the applied blocks may be stored in the block store.

Here, the new participating node may insert the missing blocks that are not applied to the block store into the waiting blocklist at step S828.

Here, the new participating node may receive the synchronization target blocks in parallel, applies the blocks subsequent to the block last applied to the state DB to the state DB in the order of the block numbers, and store the same in the block store at step S829.

Here, at step S829, the blocks in the waiting blocklist may be sequentially applied to the state DB.

Also, the new participating node may determine whether it is necessary to generate a snapshot at step S830.

That is, at step S830, whether the block number of the applied block corresponds to the last block of each section may be determined.

Here, when the block number of the applied block corresponds to the last block of each section, the new participating node may generate a snapshot at step S831, and when it does not generate a snapshot, it determines that blocks up to the last missing block of the current section are applied to the state DB, so it may terminate synchronization at step S825.

Also, the new participating node may generate a snapshot from the block store for each section and generate a snapshot from the state DB only for the last section.

Also, the new participating node may generate a segment hash table at step S832 when generation of the snapshot is completed.

Also, the new participating node may verify the segment hash table at step S833 using the verification data generated at step S814.

Then, at step S833, when the blocks up to the last missing block of the current section are applied to the state DB at step S829, synchronization may be terminated at step S825.

Figure 10:
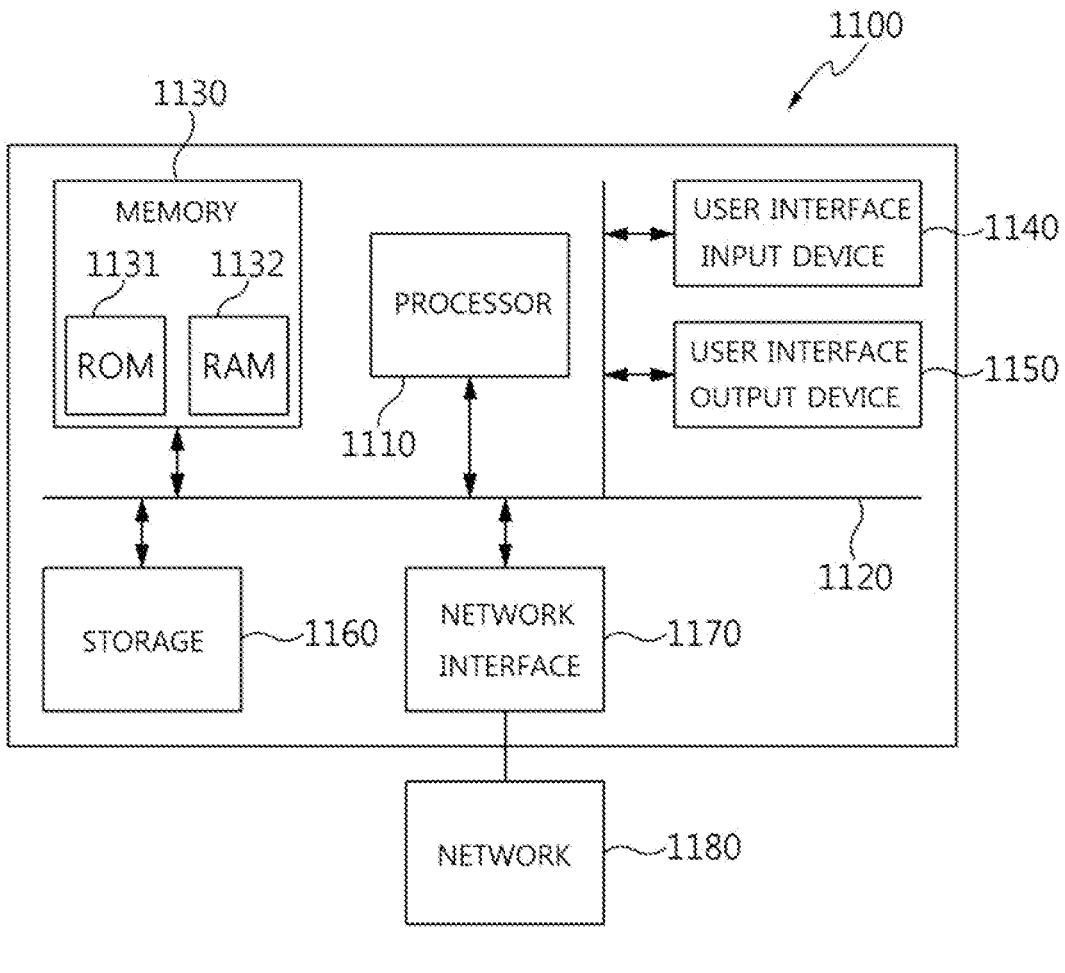
FIG. 10 is a view illustrating a computer system according to an embodiment of the present disclosure.

FIG. 10 is a view illustrating a computer system according to an embodiment of the present disclosure.

Referring to FIG. 10, all of the nodes of the blockchain system and the apparatus for synchronizing a block in a blockchain network according to an embodiment of the present disclosure may be implemented in a computer system 1100 including a computer-readable recording medium. As illustrated in FIG. 10, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be any of various types of volatile or nonvolatile storage media. For example, the memory may include ROM 1131 or RAM 1132.

The apparatus for synchronizing a block in a blockchain network according to an embodiment of the present disclosure includes one or more processors 1110 and memory 1130 for storing at least one program executed by the one or more processors 1110, and the at least one program synchronizes node information of existing participating nodes connected to a blockchain network by joining the blockchain network, determines synchronization target blocks by calculating the current section of a blockchain based on an agreed-upon block received from the existing participating nodes, receives a block header of each section and a segment hash table of a snapshot that are verification data for verifying synchronization target data for the synchronization target blocks from participating nodes that are not connected as peers, among the existing participating nodes, generates a snapshot by receiving snapshot segments and blocks of the current section, which are the synchronization target data, from participating nodes connected as peers, among the existing participating nodes, verifies the snapshot generated from the snapshot segments, and synchronizes the verified snapshot.

Here, the section may be set to include a preset number of blocks in order of block numbers depending on a size preset in the blockchain, and the snapshot is generated for each section in the blockchain, thereby including block information corresponding to the section.

Here, the at least one program may verify the signature information of the block header of the agreed-upon block using the node information.

Here, the at least one program may calculate the current section of the blockchain using the block number of the agreed-upon block.

Here, the at least one program verifies, for each section, whether the hash value of a previous block header stored in the start block of the section is equal to the hash value of the block header of the last block of the previous section using the block header of each section, thereby verifying the continuity of the agreed-upon block.

Here, when a full synchronization mode is set, the at least one program may calculate the number of snapshot segments and request the snapshot segments and missing blocks of the current section from the participating nodes connected as peers.

Here, when a partial synchronization mode is set, the at least one program may request the blocks to receive from the participating nodes connected as peers based on any one of the previously stored last snapshot and last block.

Here, the existing participating nodes may partition the snapshot into segments having a preset size, calculate hash values for the segments, and store the hash values in a segment hash table.

Here, the at least one program may calculate a hash value for the snapshot using the segments and verify the hash value using the segment hash table.

Here, the at least one program stores the snapshot in a state database for storing information about nodes receiving the agreed-upon block and a block store for storing the agreed-upon block in order to synchronize a blockchain state when connected to the blockchain network, thereby synchronizing the snapshot.

According to the present disclosure, blocks are synchronized in parallel, whereby a node newly connected or reconnected to a blockchain network may quickly participate in a distributed consensus in a distributed consensus environment based on decentralized Byzantine fault tolerance.

Also, according to the present disclosure, synchronization may be verified even when a Byzantine node maliciously hinders synchronization.

As described above, the apparatus and method for synchronizing a block in a blockchain network according to the present disclosure are not limitedly applied to the configurations and operations of the above-described embodiments, but all or some of the embodiments may be selectively combined and configured, so the embodiments may be modified in various ways.

What is claimed is:

1. An apparatus for synchronizing a block in a blockchain network, comprising:
    one or more processors; and
    memory for storing at least one program executed by the one or more processors,
    wherein the at least one program
        synchronizes node information of existing participating nodes connected to the blockchain network by joining the blockchain network,
        determines synchronization target blocks by calculating a current section of a blockchain using an agreed-upon block received from the existing participating nodes, wherein each section includes a predetermined number of blocks,
        receives a block header of each section and a segment hash table of a snapshot that are verification data for verifying synchronization target data for the synchronization target blocks from participating nodes that are not connected as peers, among the existing participating nodes, and verifies continuity between sections by comparing a previous block header hash stored in a start block of each section with a hash value of a last block header of a previous section,
        generates a snapshot by compressing blocks of the current section, and receiving snapshot segments and blocks of the current section, which are the synchronization target data, from participating nodes connected as peers, among the existing participating nodes,
        verifies the snapshot generated from the snapshot segments, and
        synchronizes the verified snapshot;
    wherein
        when a number of missing sections does not exceed a preset value, a partial synchronization mode is set for partial synchronization, and when the partial synchronization mode is set, the at least one program requests blocks to receive from the participating nodes connected as peers based on any one of a previously stored last snapshot and a previously stored last block, and
        when the number of missing sections exceeds the preset value, full synchronization is performed.

2. The apparatus of claim 1, wherein:
    the section is set to include a preset number of blocks in order of block numbers depending on a size preset in the blockchain, and
    the snapshot is generated for each section in the blockchain, thereby including block information corresponding to the section.

3. The apparatus of claim 2, wherein the at least one program verifies signature information of a block header of the agreed-upon block using the node information.

4. The apparatus of claim 2, wherein the at least one program calculates the current section of the blockchain using a block number of the agreed-upon block.

5. The apparatus of claim 3, wherein the at least one program verifies for each section whether a hash value of a previous block header stored in a start block of the section is equal to a hash value of a block header of a last block of a previous section using the block header of each section, thereby verifying continuity of the agreed-upon block.

6. The apparatus of claim 5, wherein, when a full synchronization mode is set, the at least one program calculates a number of snapshot segments and requests the snapshot segments and missing blocks of the current section from the participating nodes connected as peers.

7. The apparatus of claim 5, wherein the existing participating nodes partition the snapshot into segments having a preset size, calculate hash values for the segments, and store the hash values in the segment hash table.

8. The apparatus of claim 7, wherein the at least one program calculates a hash value for the snapshot using the segments and verifies the hash value using the segment hash table.

9. The apparatus of claim 8, wherein the at least one program stores the snapshot in a state database for storing information about nodes receiving the agreed-upon block and a block store for storing the agreed-upon block in order to synchronize a blockchain state when connected to the blockchain network, thereby synchronizing the snapshot.

10. A method for synchronizing a block in a blockchain network, performed by an apparatus for synchronizing a block in the blockchain network, comprising:
    synchronizing node information of existing participating nodes connected to the blockchain network by joining the blockchain network;
    determining synchronization target blocks by calculating a current section of a blockchain using an agreed-upon block received from the existing participating nodes, wherein each section includes a predetermined number of blocks;
    receiving a block header of each section and a segment hash table of a snapshot that are verification data for verifying synchronization target data for the synchronization target blocks from participating nodes that are not connected as peers, among the existing participating nodes, and verifying continuity between sections by comparing a previous block header hash stored in a start block of each section with a hash value of a last block header of a previous section;
    generating a snapshot by compressing blocks of the current section, and receiving snapshot segments and blocks of the current section, which are the synchronization target data, from participating nodes connected as peers, among the existing participating nodes;

verifying the snapshot generated from the snapshot segments; and synchronizing the verified snapshot;

wherein when a number of missing sections does not exceed a preset value, a partial synchronization mode is set for partial synchronization, and receiving the block header of each section and the segment hash table of the snapshot comprises requesting blocks to receive from the participating nodes connected as peers based on any one of a previously stored last snapshot and a previously stored last block when a partial synchronization mode is set, and when the number of missing sections exceeds the preset value, full synchronization is performed.

11. The method of claim 10, wherein:

the section is set to include a preset number of blocks in order of block numbers depending on a size preset in the blockchain, and the snapshot is generated for each section in the blockchain, thereby including block information corresponding to the section.

12. The method of claim 11, wherein synchronizing the node information comprises verifying signature information of a block header of the agreed-upon block using the node information.

13. The method of claim 12, wherein determining the synchronization target blocks comprises calculating the current section of the blockchain using a block number of the agreed-upon block.

14. The method of claim 13, wherein receiving the block header of each section and the segment hash table of the snapshot comprises verifying for each section whether a hash value of a previous block header stored in a start block of the section is equal to a hash value of a block header of a last block of a previous section using the block header of each section, thereby verifying continuity of the agreed-upon block.

15. The method of claim 14, wherein receiving the block header of each section and the segment hash table of the snapshot comprises calculating a number of snapshot segments and requesting the snapshot segments and missing blocks of the current section from the participating nodes connected as peers when a full synchronization mode is set.

16. The method of claim 14, wherein the existing participating nodes partition the snapshot into segments having a preset size, calculate hash values for the segments, and store the hash values in the segment hash table.

17. The method of claim 16, wherein synchronizing the verified snapshot comprises calculating a hash value for the snapshot using the segments and verifying the hash value using the segment hash table.

18. The method of claim 17, wherein synchronizing the verified snapshot comprises storing the snapshot in a state database for storing information about nodes receiving the agreed-upon block and a block store for storing the agreed-upon block in order to synchronize a blockchain state when connected to the blockchain network, thereby synchronizing the snapshot.

* * * * *